US012318352B2

(12) United States Patent
Luo

(10) Patent No.: US 12,318,352 B2
(45) Date of Patent: Jun. 3, 2025

(54) MASSAGER

(71) Applicant: Changjun Luo, Heyuan (CN)

(72) Inventor: Changjun Luo, Heyuan (CN)

(*) Notice: Subject to any disclaimer, the term of this patent is extended or adjusted under 35 U.S.C. 154(b) by 0 days.

(21) Appl. No.: 18/808,984

(22) Filed: Aug. 19, 2024

(65) Prior Publication Data

US 2024/0407967 A1 Dec. 12, 2024

(30) Foreign Application Priority Data

Jun. 21, 2024 (CN) ......................... 202410815548.5

(51) Int. Cl.
*A61H 9/00* (2006.01)
*A61H 19/00* (2006.01)

(52) U.S. Cl.
CPC ..... *A61H 9/005* (2013.01); *A61H 2009/0064* (2013.01); *A61H 19/00* (2013.01); *A61H 2201/1215* (2013.01)

(58) Field of Classification Search
CPC .......... A61H 7/00; A61H 7/001; A61H 7/003; A61H 7/004; A61H 7/005; A61H 9/0057; A61H 19/00; A61H 19/30; A61H 19/32; A61H 19/34; A61H 19/40; A61H 19/50; A61H 23/00; F04B 45/04; F04B 43/02; F04B 43/0054
See application file for complete search history.

(56) References Cited

U.S. PATENT DOCUMENTS 787,443 A * 4/1905 Godman ................. A61F 11/00 601/77
939,822 A * 11/1909 Fey ........................ A61H 9/005 601/9
1,502,440 A * 7/1924 Robert .................. A61H 9/005 601/65
1,882,040 A * 10/1932 Roehm .................. A61H 9/005 604/315
2,218,081 A * 10/1940 Brichieri-Colombi ...................... A61H 23/04 601/139
12,138,220 B1 * 11/2024 Lin ...................... A61H 9/0007
2003/0176817 A1 * 9/2003 Chang .................... A61H 23/02 601/9
2009/0221941 A1 * 9/2009 Ikeler .................. A61H 9/0092 601/44
2019/0117495 A1 4/2019 Zhang
2023/0022993 A1 * 1/2023 Yu ........................ A61H 23/006
2023/0048210 A1 * 2/2023 Chen ...................... A61H 7/001
2023/0320924 A1 10/2023 Zhou et al.
2024/0041692 A1 2/2024 Zhou

* cited by examiner

*Primary Examiner* — Justine R Yu
*Assistant Examiner* — Christopher E Miller

(57) ABSTRACT

The present invention discloses a massager, where an air pressure generating member is provided in an accommodating cavity, where an air pressure generating member is provided with an inner cavity thereon, the inner cavity is provided with a separating body therein to separate the inner cavity to form at least two air pressure generating cavities isolated from each other, openings of the air pressure generating cavities are respectively connected with massage ports, and a driving device is used to drive the separating body to deform or oscillate or displace to increase or decrease a volume of at least one air pressure generating cavity, so that an air pressure difference is formed between two massage ports to perform air stimulation massage on a human body.

13 Claims, 22 Drawing Sheets

MASSAGER

TECHNICAL FIELD

The present invention pertains to the technical field of massage apparatus, and in particular pertains to a massager.

BACKGROUND

With the development of society, people increasingly adopt negative pressure massage for massaging parts of the body. As a result, negative pressure massage apparatuses are increasing day by day. The negative pressure massage apparatuses in the prior art generally use air pumps for negative pressure massage, such as a negative pressure massager disclosed in Chinese patent publication No. CN213218904U. However, such negative pressure massagers generate significant noise when the air pump works during use, and therefore there is an urgent need for a massager capable of solving the above technical problem.

SUMMARY

The present invention provides a massager designed to solve the above-mentioned

Technical Problem

A massager according to the present invention includes:

- a housing provided with an accommodating cavity and at least two massage ports thereon;
- an air pressure generating member provided in the accommodating cavity, where the air pressure generating member is provided with an inner cavity thereon, the inner cavity is provided with a separating body therein, the separating body separates the inner cavity to form at least two air pressure generating cavities isolated from each other, and each of the air pressure generating cavities is in communication with the corresponding massage port respectively; and
- a driving device, where a driving portion of the driving device is connected with the separating body, and the driving portion of the driving device is configured to drive the separating body to deform or displace or oscillate to increase or decrease a volume of at least one of the air pressure generating cavities to decrease or increase an internal air pressure, so that an air pressure difference is formed between the at least two massage ports.

The massager according to the present invention has the following beneficial effects:

1. The motor is utilized to drive the separating body to deform or oscillate or displace to increase or decrease the volume of at least one air pressure generating cavity so as to decrease or increase the internal air pressure, which promotes the formation of an air pressure difference between two massage ports to perform air stimulation massage on human skin in a manner of generating decreased noise, which improves the massage experience.
2. The skin contact portion of the flexible housing having the two massage ports is flexible, providing comfort when the massage port area is in contact with human skin.

Figure 1:
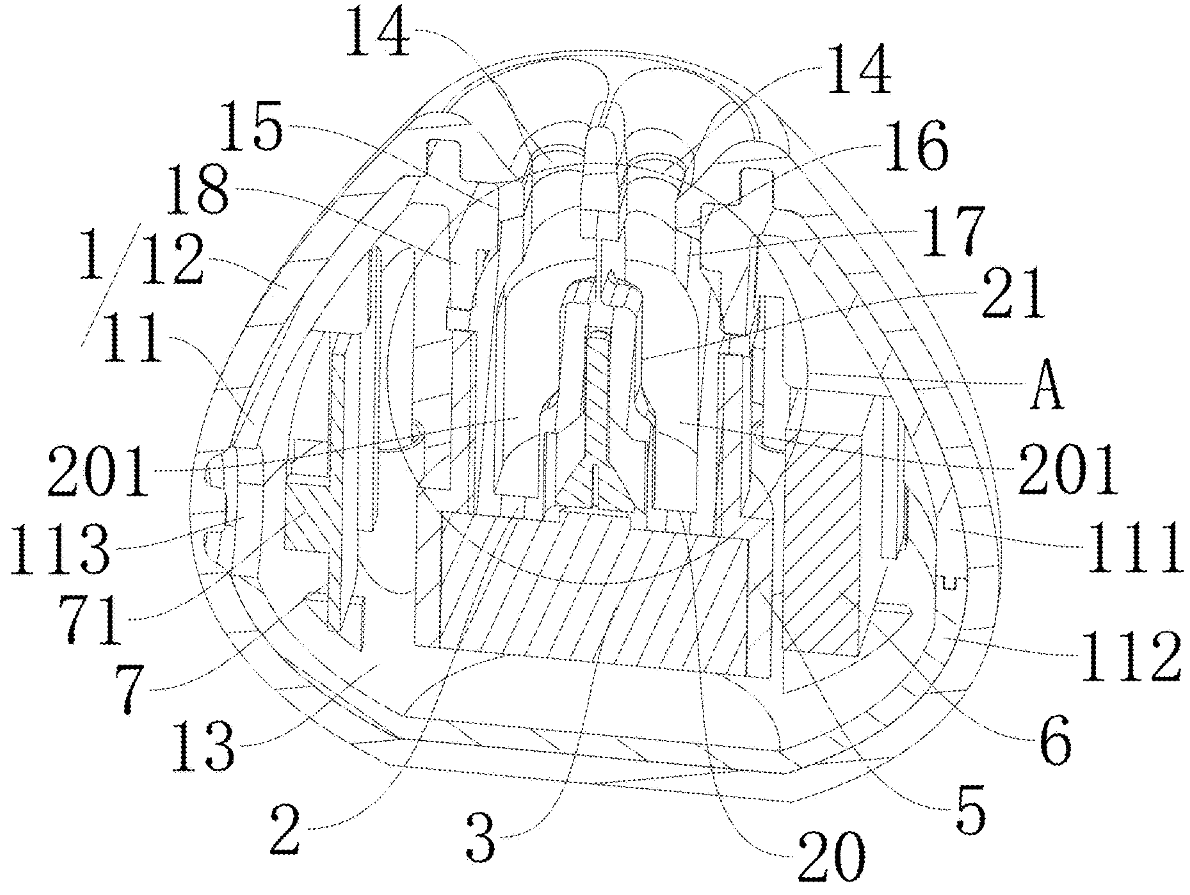
FIG. 1 is a first structural schematic diagram of an integral massager.
Figure 2:
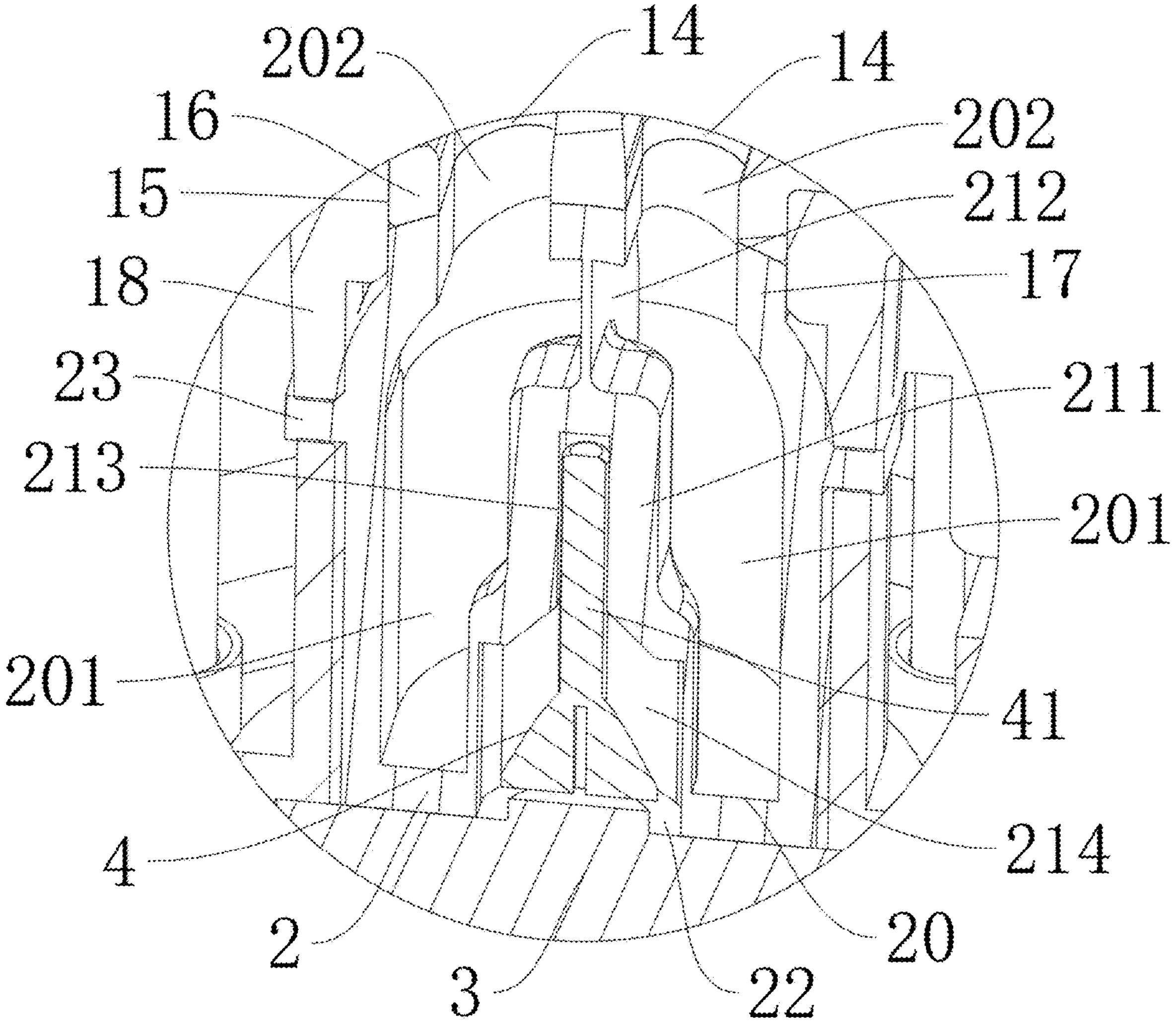
FIG. 2 is an enlarged view of A.
Figure 3:
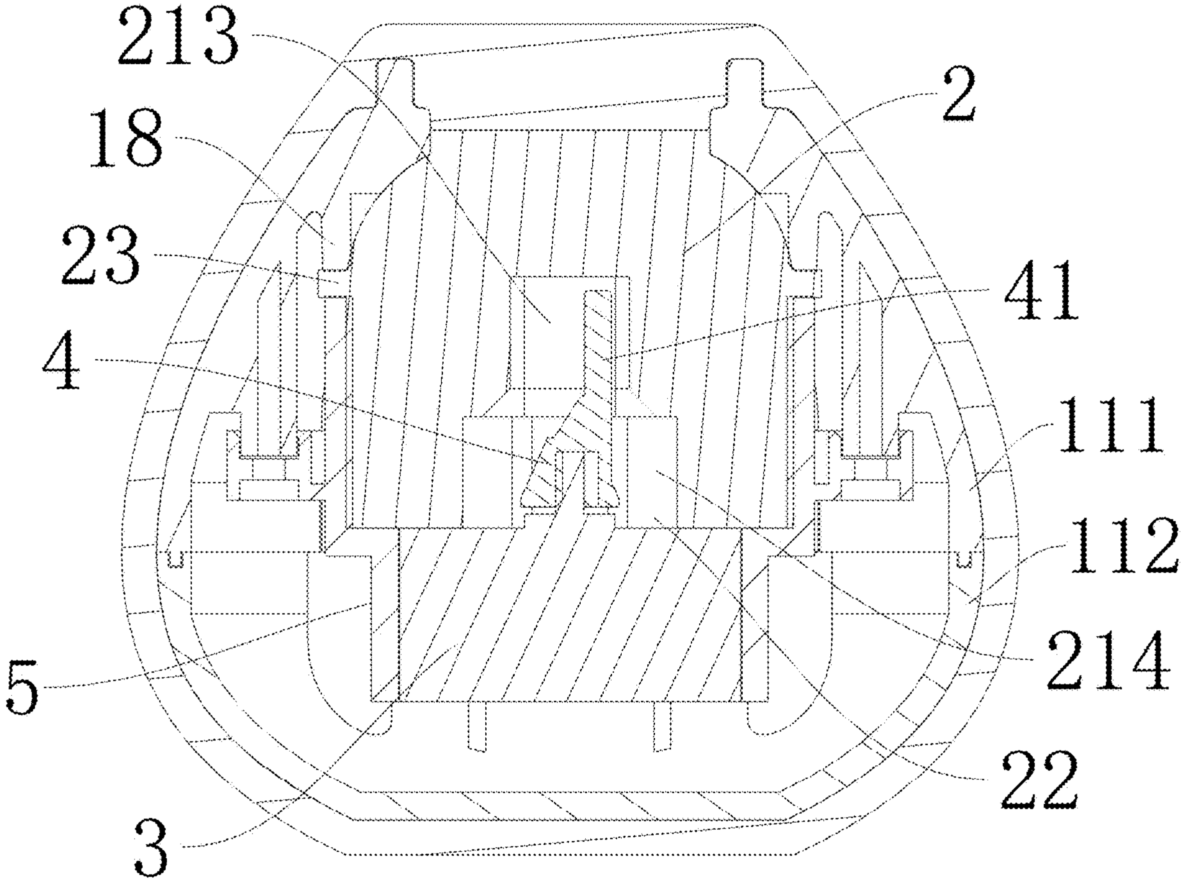
FIG. 3 is a second structural schematic diagram of an integral massager.
Figure 4:
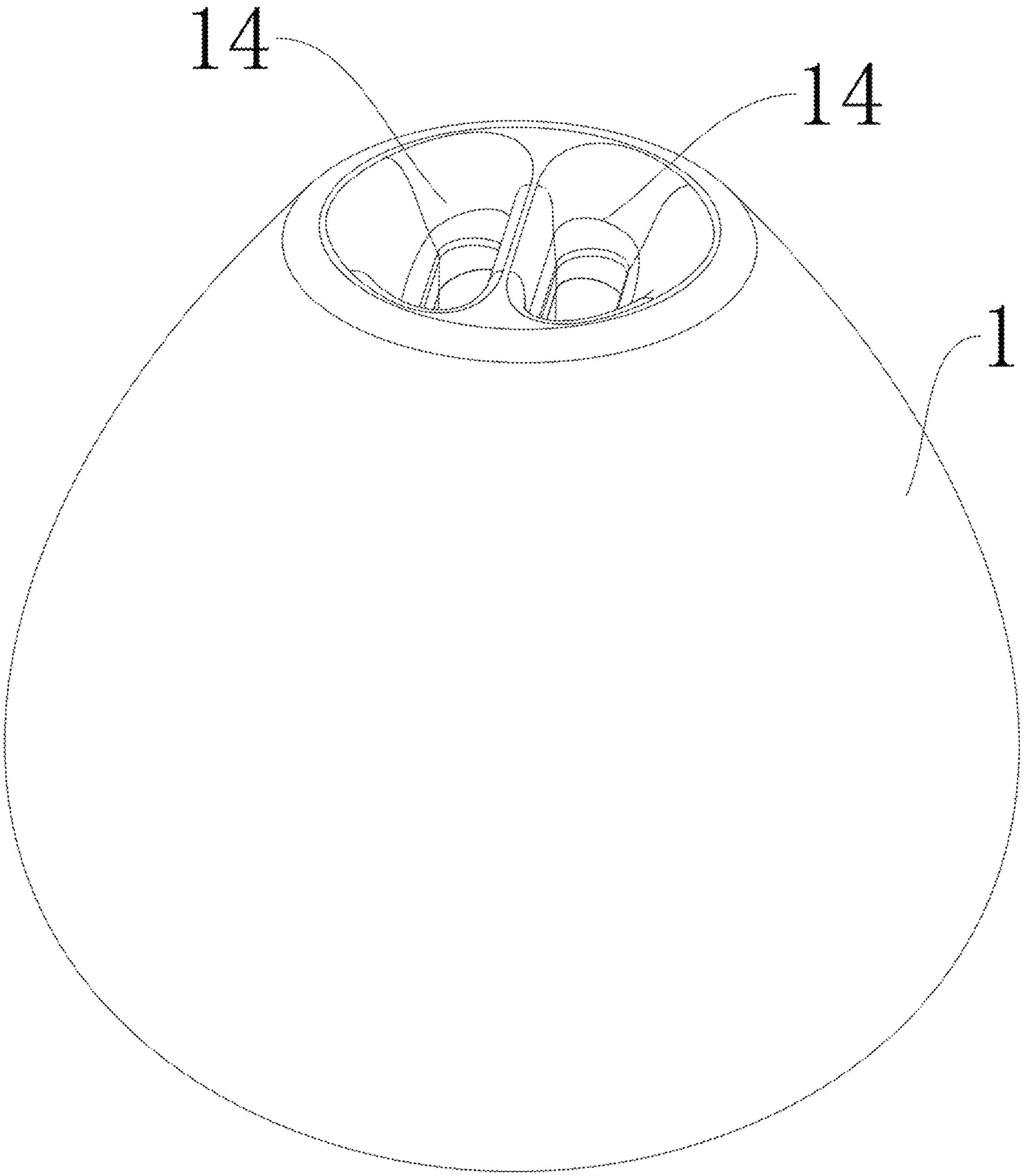
FIG. 4 is a third structural schematic diagram of an integral massager.
Figure 5:
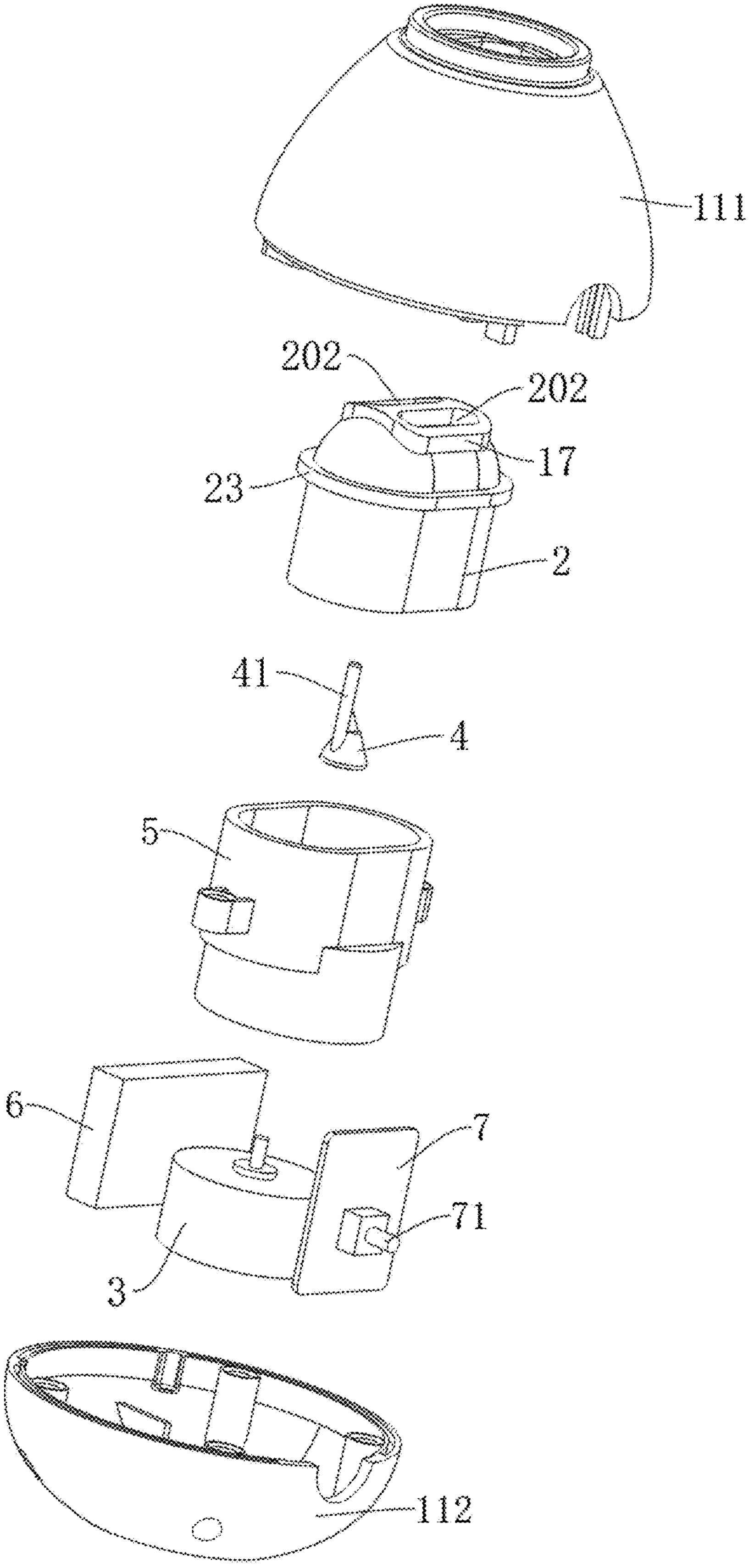
FIG. 5 is an exploded view.
Figure 6:
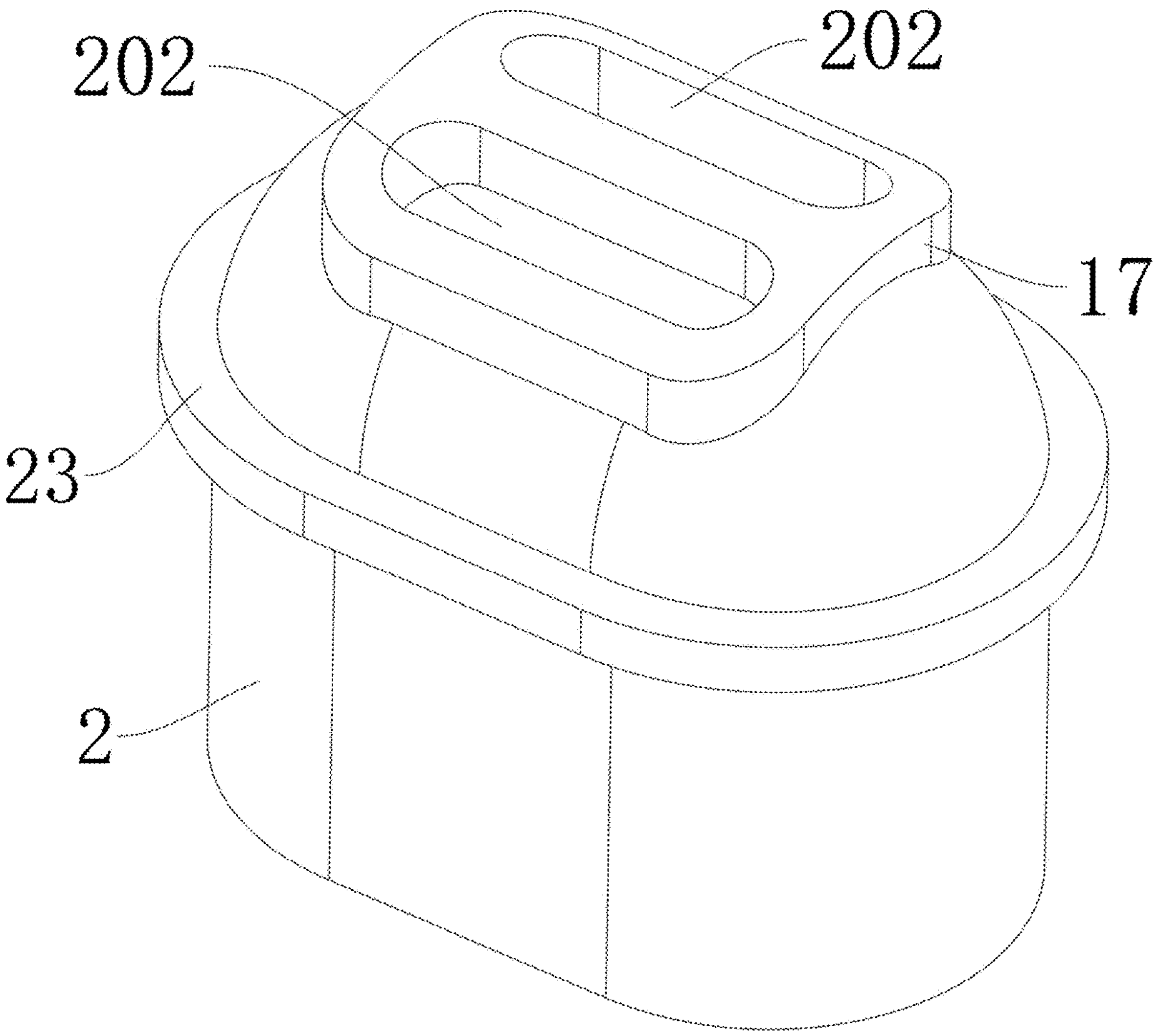
FIG. 6 is a first structural schematic diagram of an air pressure generating member.
Figure 7:
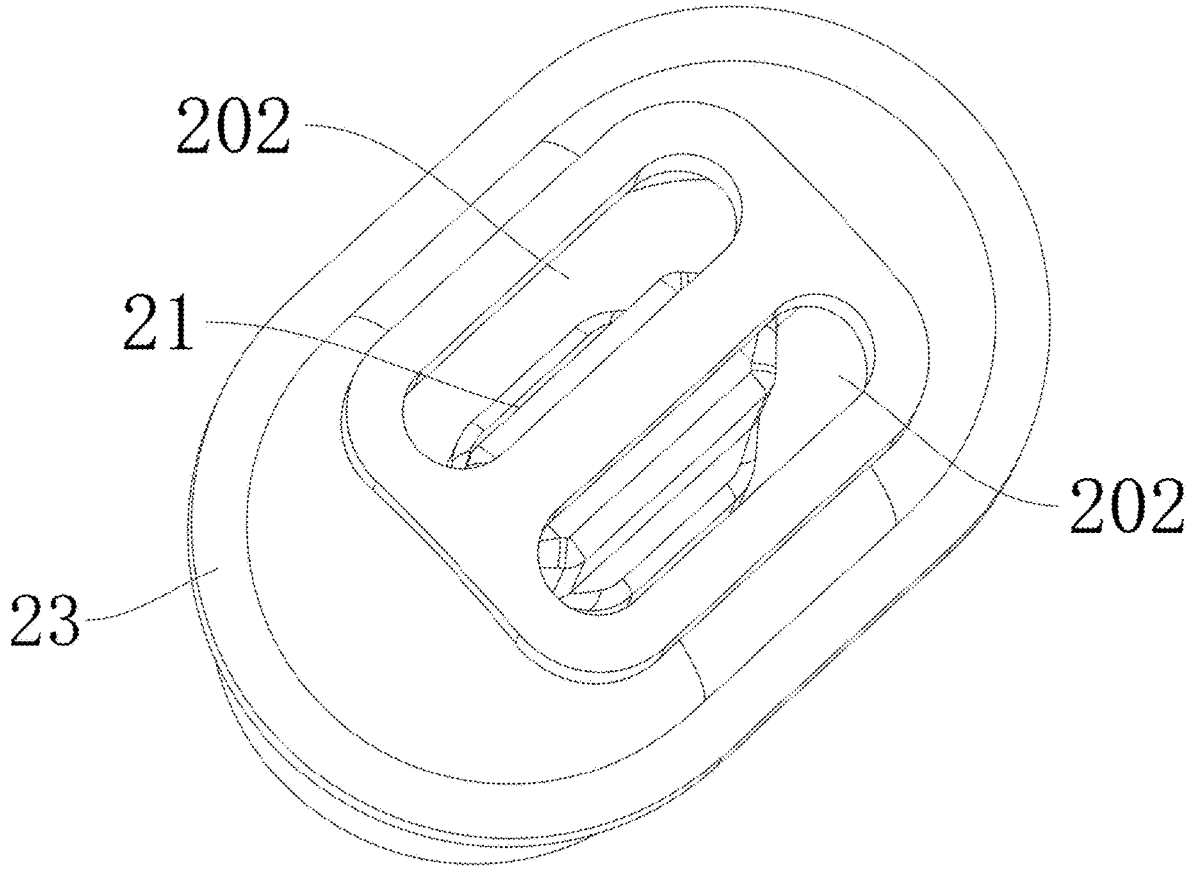
FIG. 7 is a second structural schematic diagram of an air pressure generating member.
Figure 8:
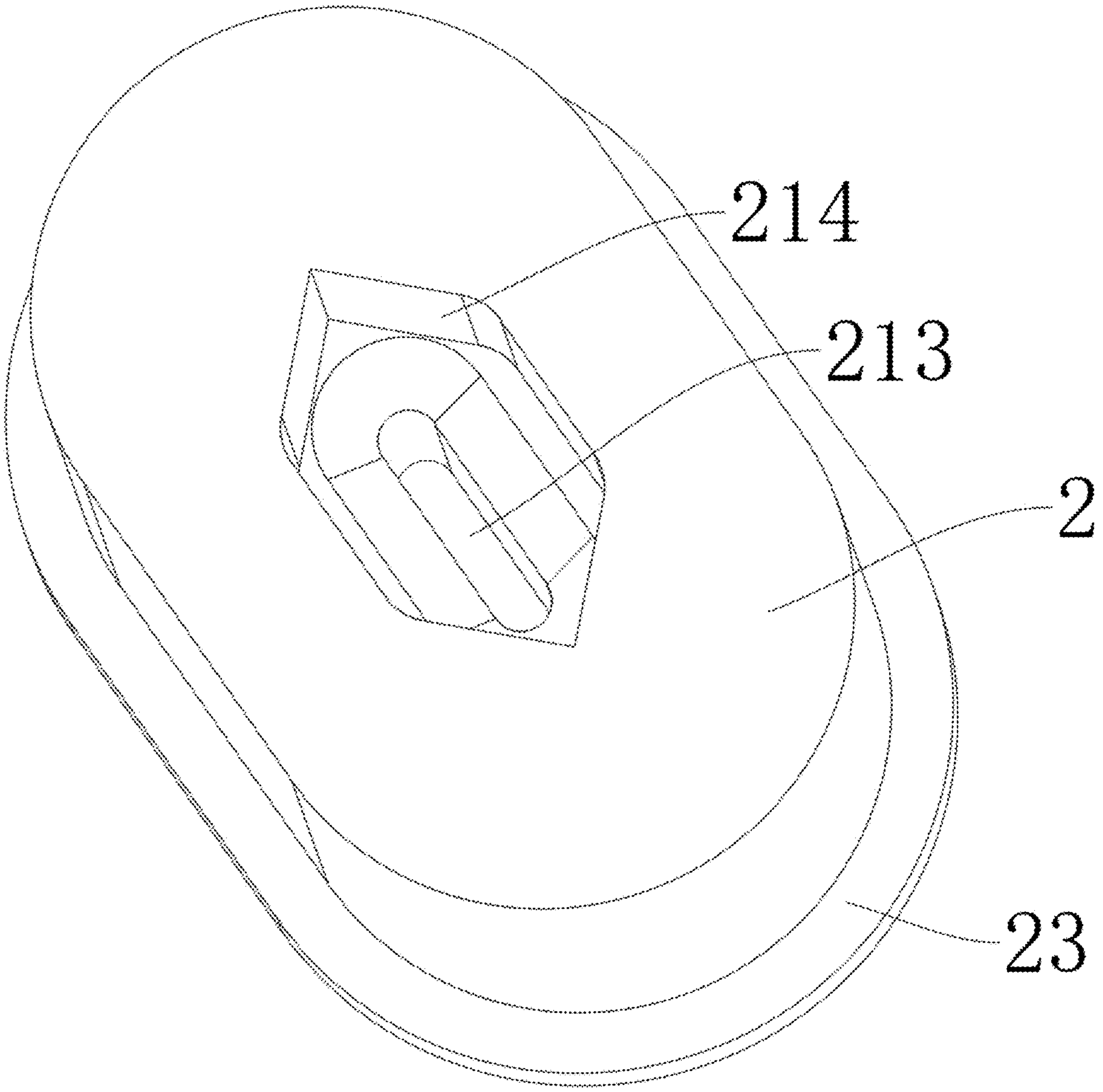
FIG. 8 is a third structural schematic diagram of an air pressure generating member.
Figure 9:
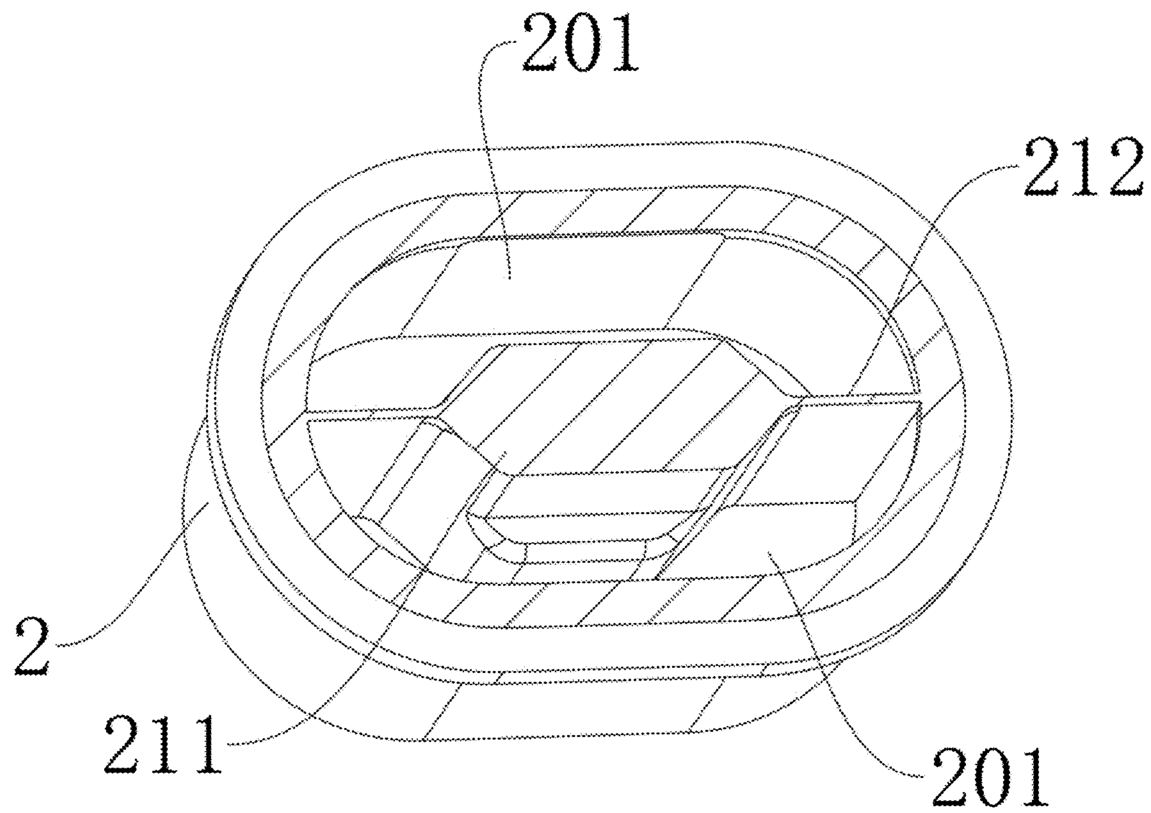
FIG. 9 is a first structural schematic diagram of a cross section of an air pressure generating member.
Figure 10:
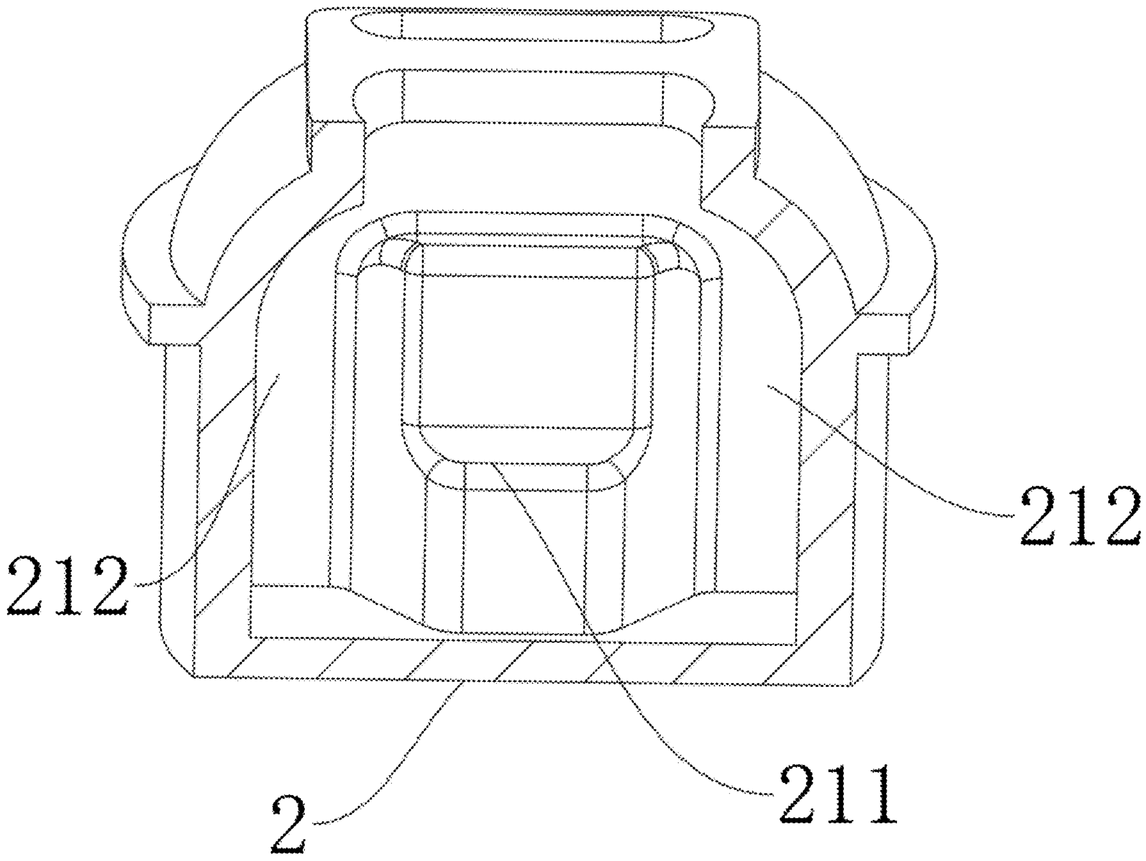
FIG. 10 is a second structural schematic diagram of a cross section of an air pressure generating member.
Figure 11:
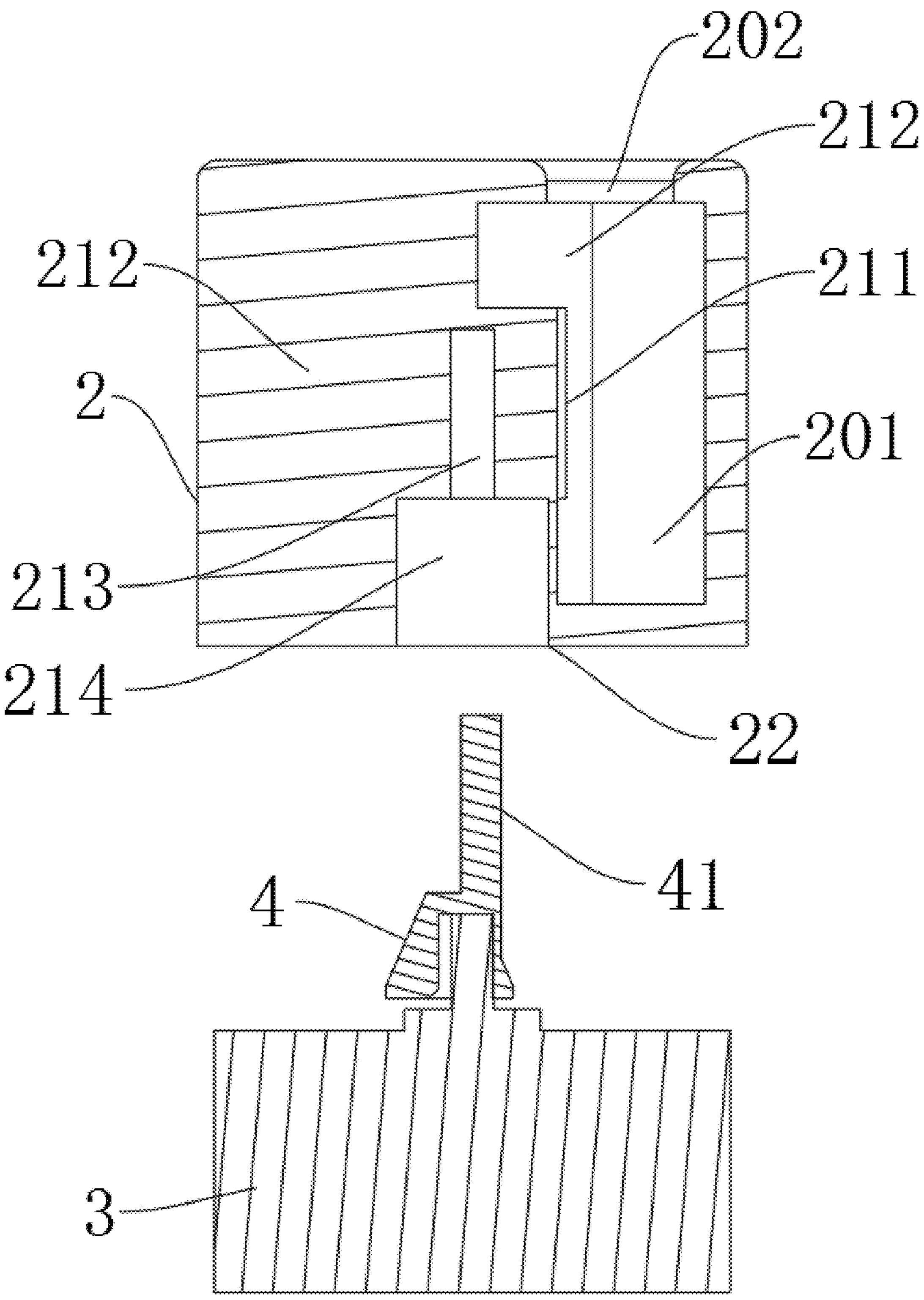
FIG. 11 is a first structural schematic diagram of another air pressure generating member combined with a motor.
Figure 12:
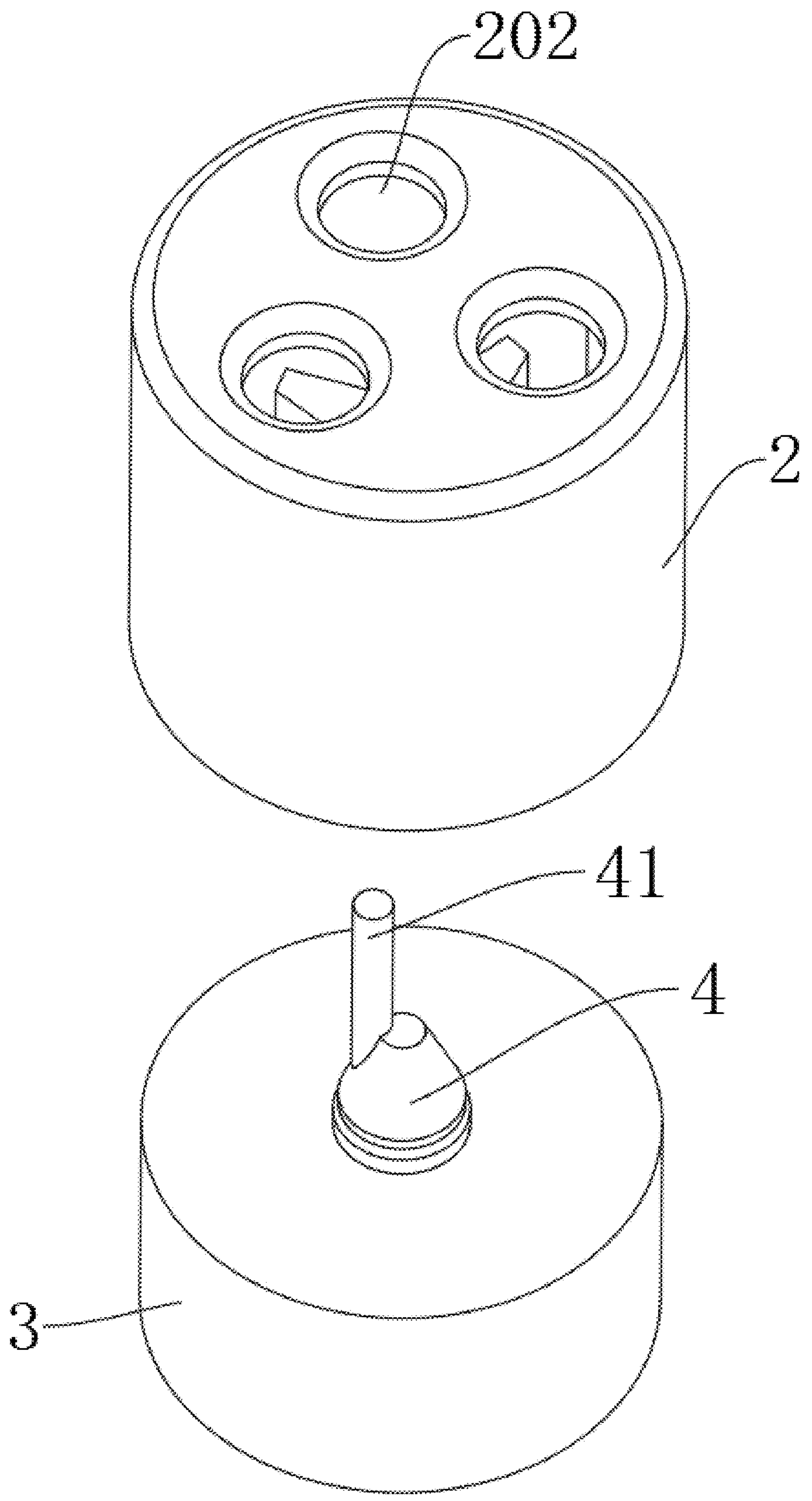
FIG. 12 is a second structural schematic diagram of another air pressure generating member combined with a motor.
Figure 13:
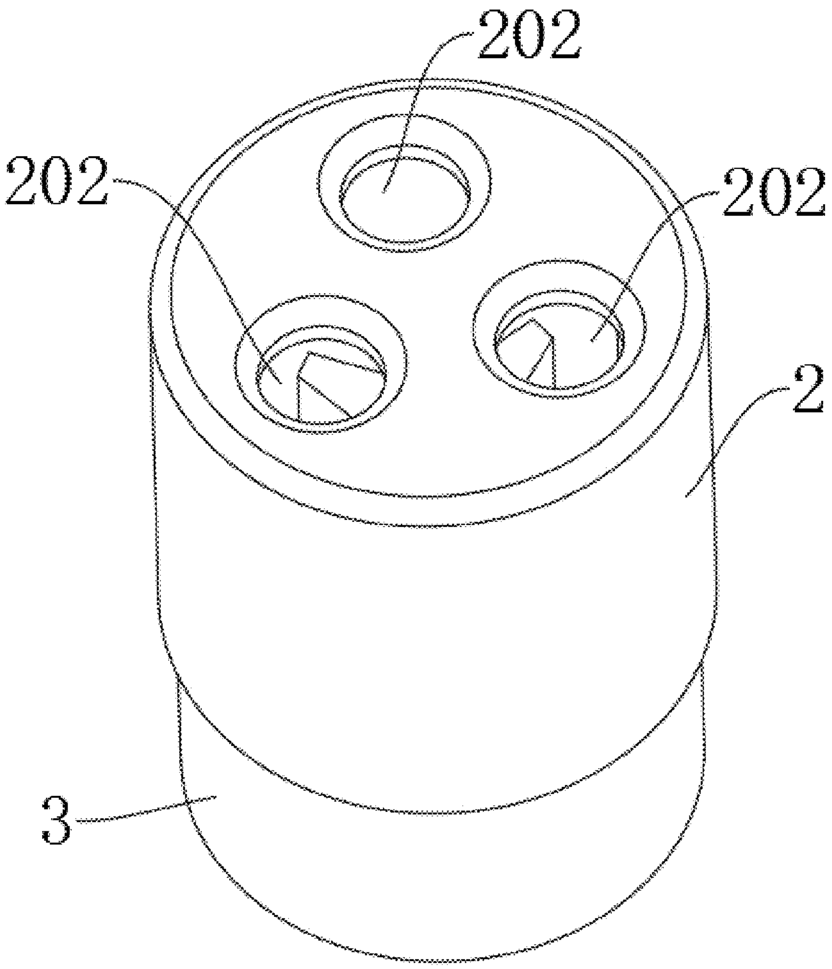
FIG. 13 is a third structural schematic diagram of another air pressure generating member combined with a motor.
Figure 14:
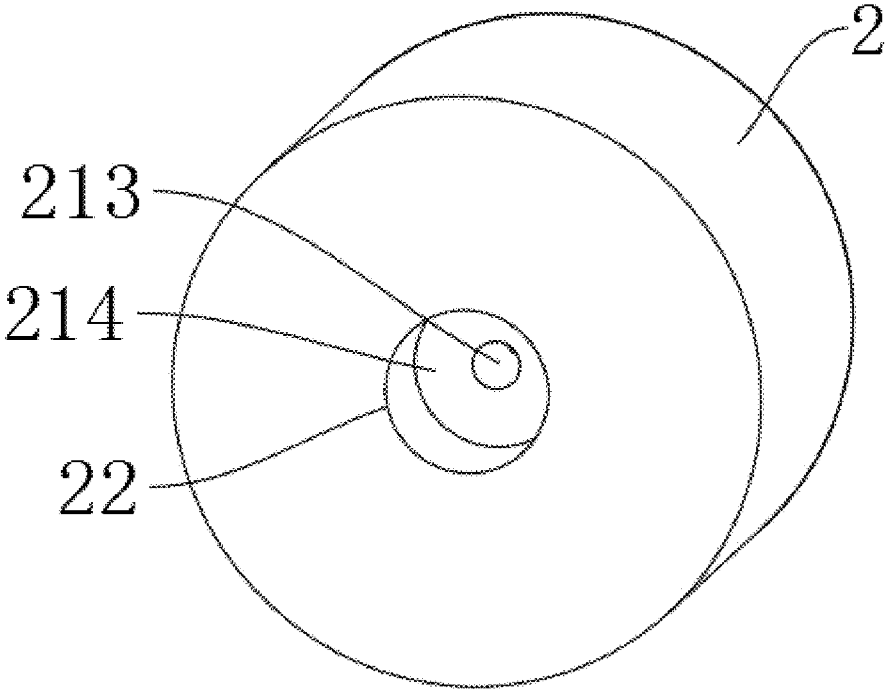
FIG. 14 is a first structural schematic diagram of another air pressure generating member.
Figure 15:
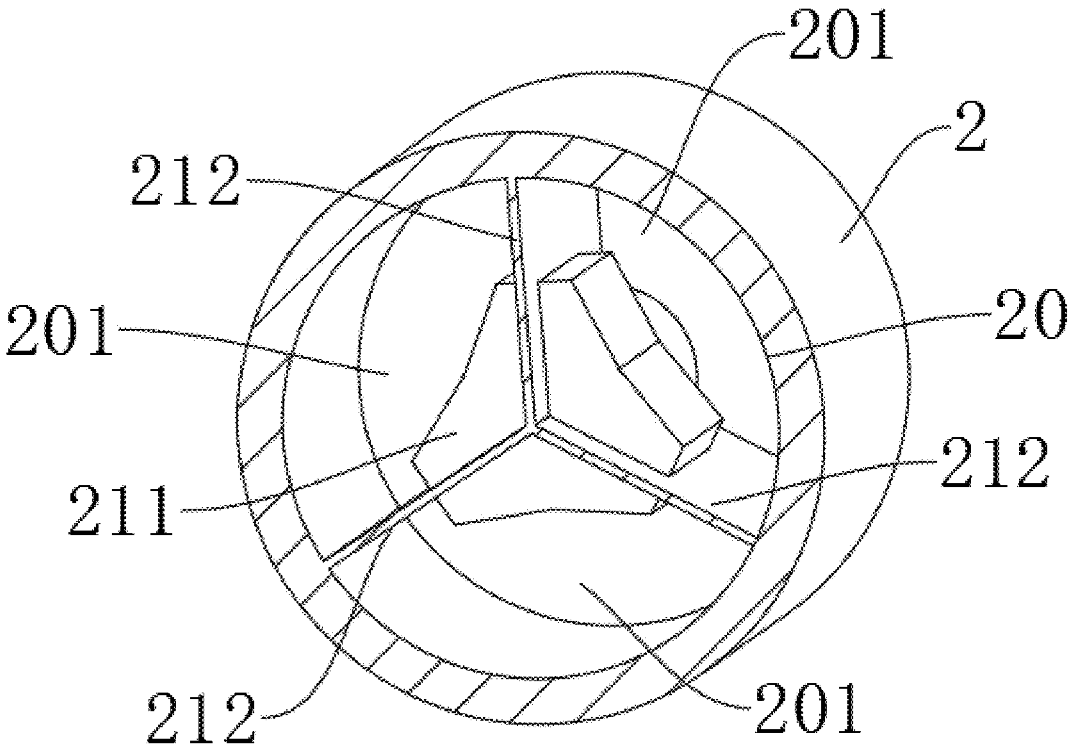
FIG. 15 is a second structural schematic diagram of another air pressure generating member.
Figure 16:
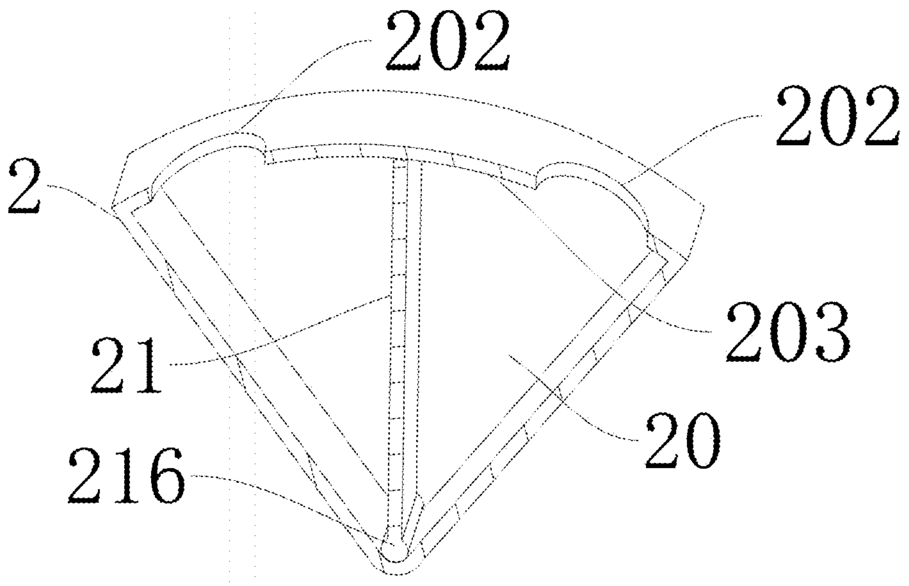
FIG. 16 is a first structural schematic diagram of an air pressure generating member in a sector-shaped inner cavity.
Figure 17:
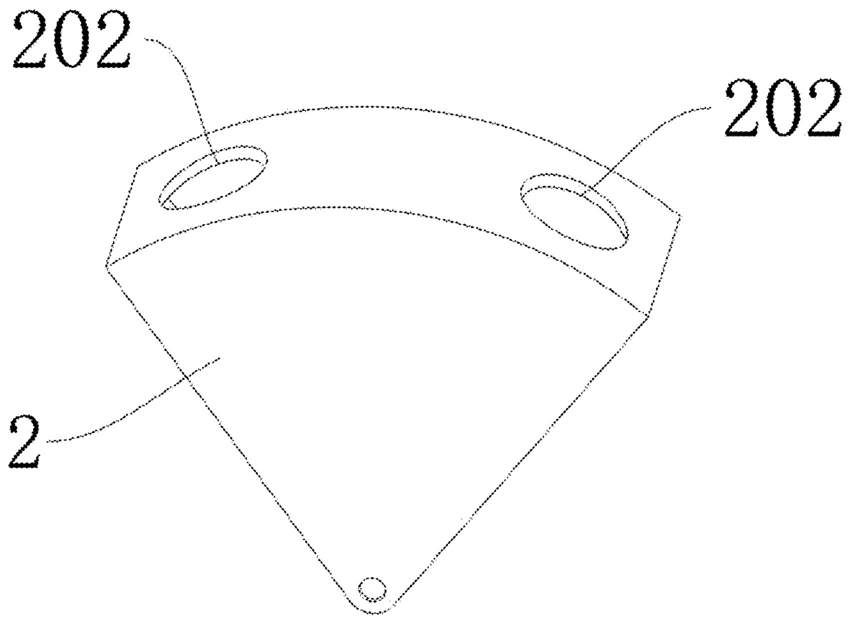
FIG. 17 is a second structural schematic diagram of an air pressure generating member in a sector-shaped inner cavity.
Figure 18:
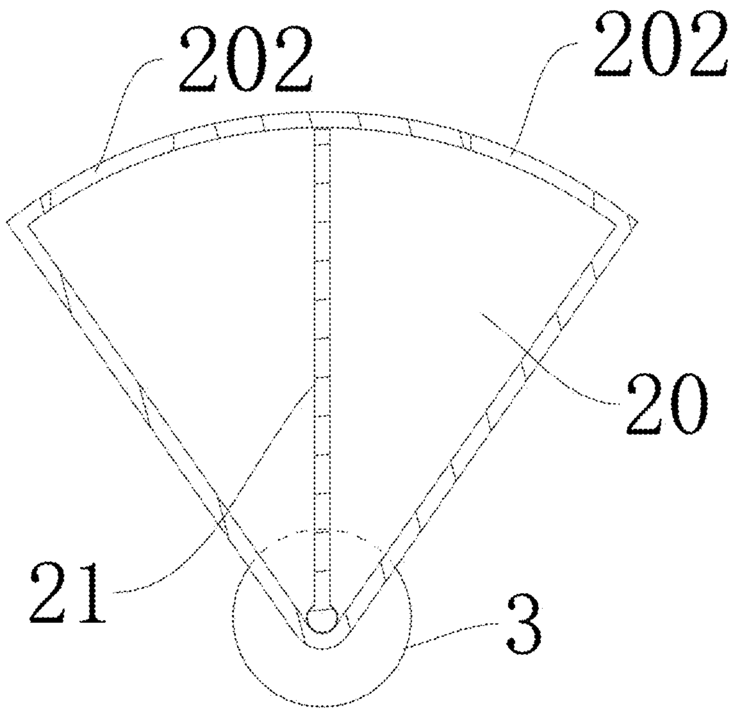
FIG. 18 is a third structural schematic diagram of an air pressure generating member in a sector-shaped inner cavity.
Figure 19:
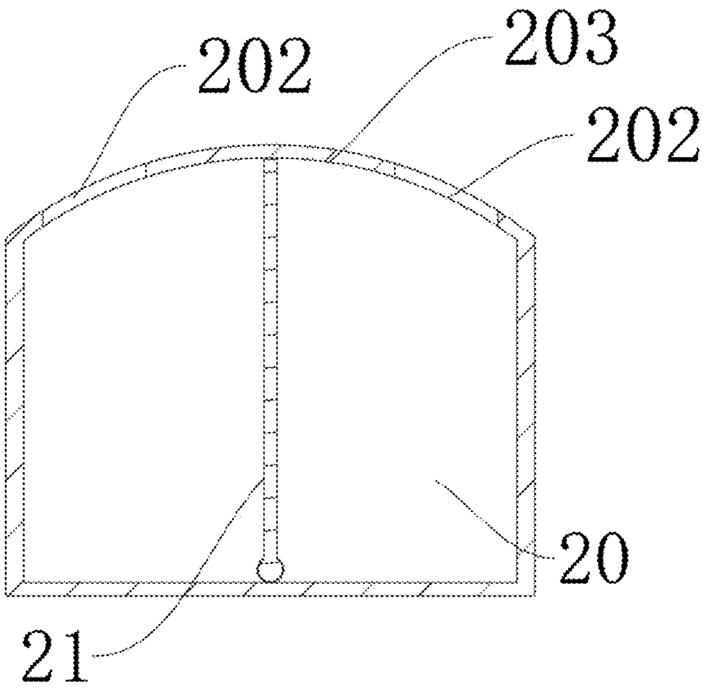
FIG. 19 is a structural schematic diagram of an air pressure generating member in a rectangular inner cavity.

Reference numerals in the drawings: 1. housing; 11. rigid housing; 111. first shell; 112. second shell; 113, perforation; 12. flexible housing; 13. accommodating cavity; 14. massage port; 15. through hole; 16. first positioning body; 17. second positioning body; 18. positioning sleeve; 2. air pressure generating member; 20. inner cavity; 201. air pressure generating cavity; 202. opening; 203. circular arc inner wall; 21. separating body; 211. flexible connecting sleeve; 212. flexible sheet; 213. insertion slot; 214. elongated transition cavity; 215. linkage rod; 216. cylinder; 22. insertion hole; 23. convex ring; 3. motor; 4. rotating member; 41. eccentric member; 5. mounting sleeve; 6. battery; 7. control board; 71. control key; 8. electromagnetic coil.

DESCRIPTION OF THE EMBODIMENTS

The technical solutions in the embodiments of the present invention will be clearly and completely described below in conjunction with the accompanying drawings in the embodiments of the present invention. Obviously, the embodiments described are only part but not all of the embodiments of the present invention. All other embodiments obtained by those of ordinary skill in the art based on the embodiments of the present invention fall within the scope of the present invention.

Embodiment I

As shown in FIGS. 1-8, a massager according to the present embodiment includes a housing 1, an air pressure generating member 2 and a driving device, the housing 1 is provided with an accommodating cavity 13 and at least two massage ports 14 arranged close to each other, the air pressure generating member 2 is arranged in the accommodating cavity 13, the air pressure generating member 2 is provided with an inner cavity 20 thereon, the inner cavity 20 is provided with a separating body 21 therein, the separating body 21 separates the inner cavity 20 to form at least two air pressure generating cavities 201 isolated from each other, openings 202 of the two air pressure generating cavities 201 are respectively connected with and communicated with the massage ports 14, and a driving portion of the driving device is connected with the separating body 21.

Further, the driving device includes a motor 3 and a rotating member 4 mounted on a rotating shaft of the motor 3, the motor 3 has a relatively large power and a torque that can drive the rotating member 4 to rotate during use, the rotating member 4 may be a disc structure or a truncated cone structure with an upper end diameter smaller than a lower end diameter, the motor 3 and the rotating member 4 are both arranged in the accommodating cavity 13, the rotating member 4 is provided with an eccentric member 41 thereon, and the eccentric member 41 is a columnar structure; the separating body 21 is a flexible separating body 21, an outer edge of the separating body 21 is connected with an inner wall of the inner cavity 20, the air pressure generating member 2 is provided thereon with an insertion hole 22 positionally corresponding to an insertion slot 213 on the separating body 21, the eccentric member 41 at least partially extends through the insertion hole 22 and is placed in the insertion slot 213 of the separating body 21, and therefore the motor 3 drives the rotating member 4 to rotate so that the eccentric member 41 rotates around a central axis of the rotating member 4 to be able to drive the separating body 21 to deform in the inner cavity 20, and since the separating body 21 is flexible, when the air pressure generating cavities 201 are two in number, the separating body 21 can be driven to deform when the eccentric member 41 moves so that a distance between two opposite inner walls of one air pressure generating cavity 201 decreases, and a distance between two opposite inner walls of the other air pressure generating cavity 201 increases; when the air pressure generating cavities 201 are three or more in number, the separating body 21 can be driven to deform when the eccentric 41 moves so that a distance between two opposite inner walls of at least one of the air pressure generating cavities 201 decreases, and a distance between two opposite inner walls of the remaining at least one air pressure generating cavity 201 increases; and the two opposite inner walls of the air pressure generating cavity 201 are respectively an outer side wall of the separating body 21 toward the air pressure generating cavity 201 and an inner wall of the corresponding air pressure generating cavity 201.

Preferably, the separating body 21 includes a flexible connecting sleeve 211 and at least two flexible sheets 212 provided on an outer side wall of the flexible connecting sleeve 211; outer edges of the flexible sheets 212 and a lower end of the flexible connecting sleeve 211 are both connected with the inner wall of the inner cavity 20, so that at least two air pressure generating cavities 201 isolated from each other are formed in the inner cavity 20, upper end portions of the flexible sheets (212) are connected with each other, and an upper section and a lower section of each of the flexible connecting sleeves 211 form the insertion slot 213 and a transition cavity 214 respectively, so that the insertion slot 213 on the separating body 21 is located in the middle of the inner cavity 20; and the insertion hole 22, the insertion slot 213 and the transition cavity 214 are coaxially arranged, and there is a spacing between an upper end of the flexible connecting sleeve 211 and an inner wall of an upper end of the inner cavity 20.

The insertion slot 213, the transition cavity 214 and the insertion hole 22 are all elongated structures, a length of the insertion slot 213 is less than a length of the transition cavity 214, and a width of the insertion slot 213 is less than a width of the transition cavity 214, so that a wall thickness of the upper section of the flexible connecting sleeve 211 is greater than a wall thickness of the lower section, a length of the insertion hole 22 is not less than the length of the elongated transition cavity 214, and a width of the insertion hole 22 is not less than the width of the elongated transition cavity 214, such a structure is mainly applicable to the case that the air pressure generating cavities 201 are two in number, accordingly, the flexible sheets 212 are two in number and arranged opposite to each other, and the massage ports 14 also need to be arranged two.

Alternatively, the insertion slot, the transition cavity 214 and the insertion hole are all circular structures, an inner diameter of the insertion slot 213 is less than an inner diameter of the transition cavity 214, so that the wall thickness of the upper section of the flexible connecting sleeve 211 is greater than the wall thickness of the lower section, and an inner diameter of the insertion hole 22 is not less than the inner diameter of the transition cavity 214, such a structure is mainly applicable to the case that the air pressure generating cavities 201 are three or more in number; accordingly, the massage ports 14 also need to be arranged three or more, and the flexible sheets 212 are also arranged three or more sheets in number; and the flexible sheets 212 are generally arranged in an annular array, so that an included angle between two adjacent flexible sheets 212 is preferably 5°-120°, preferably 120°.

Based on the above, a wall body of the air pressure generating member 2 is made of a flexible material, and a wall body of the separating body 21, each of the flexible sheets 212 and the flexible connecting sleeve 211 are combined with each other into an integral structure, so that the flexible connecting sleeve 211 is deformed when the eccentric member is wound around the central axis of the rotating member 4, thereby changing a volume size of at least two of the air pressure generating cavities 201, and the air pressure generating member 2 in the integral structure is made of a silicone material.

Figure 20:
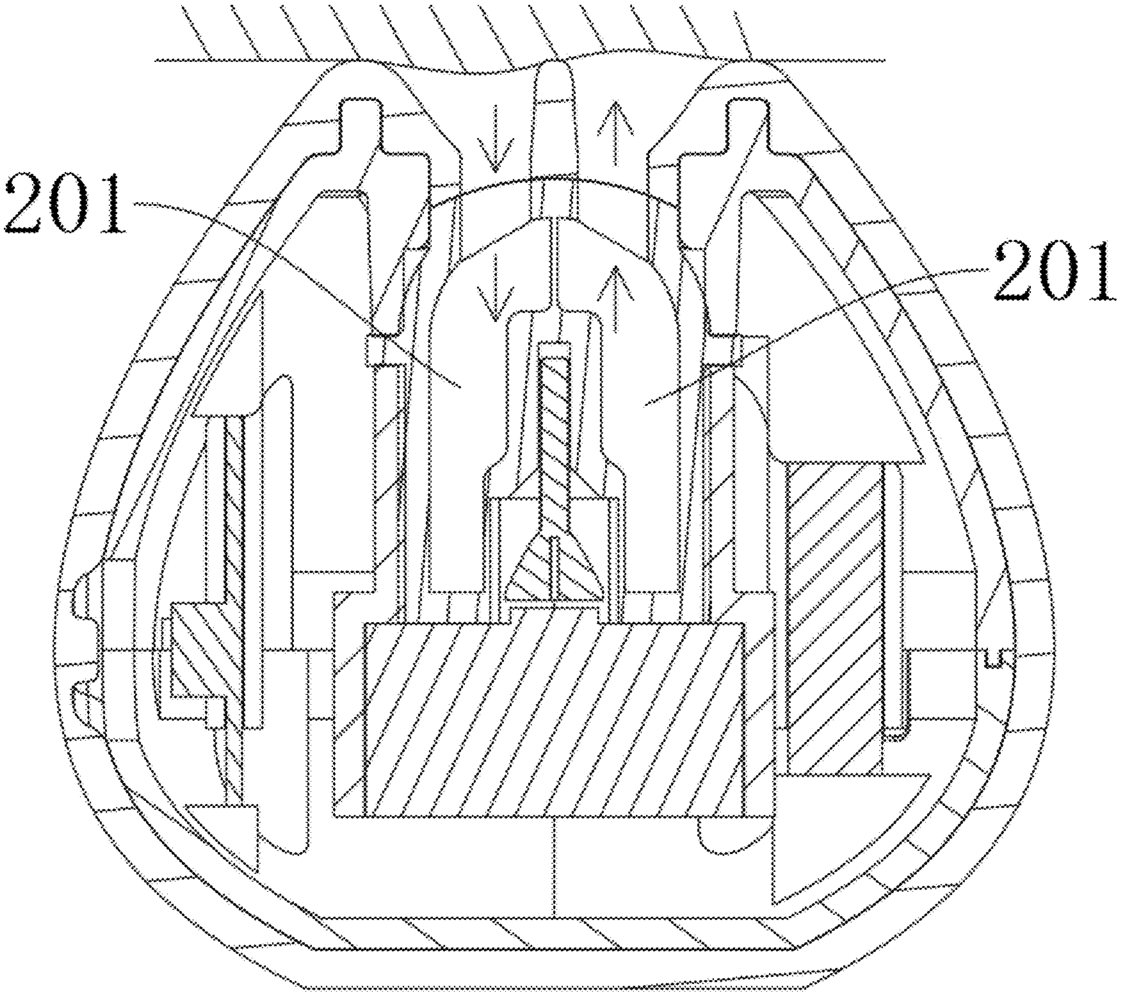
FIG. 20 is a schematic illustration of effect of skin deformation during use.

In the present embodiment, the rotating shaft of the motor 3 rotates so that the eccentric member 41 rotates about the central axis of the rotating member 4, causing the flexible connecting sleeve 211 of the separating body 21 to deform, so that the distance between the two opposite inner walls of one of two air pressure generating cavities 201 decreases, and the distance between the two opposite inner walls of the other air pressure generating cavity 201 increases or remains unchanged, or the distance between the two opposite inner walls of at least one of three air pressure generating cavities 201 decreases, and the distance between the two opposite inner walls of the remaining at least one air pressure generating cavity 201 increases, so that the volume of at least one of the air pressure generating cavities 201 decreases, and the volume of the other air pressure generating cavity 201 or the other portion thereof increases, air in the at least one air pressure generating cavity 201 with the decreased volume rushes to at least one massage port 14 correspondingly communicated therewith, and air at the massage port 14 of the other one or the other portion thereof rushes to the air pressure generating cavity 201 in corresponding communication therewith and having the increased volume, so that a pressure difference is formed between the at least two massage ports 14, therefore the at least two massage ports 14 in contact with the human skin perform air stimulation massage on the human skin. Here, as shown in FIG. 20, the massage port 14 with an increased air pressure forms air compression massage to the human skin, that is, the human skin is slightly depressed, and the massage port 14 with a decreased air pressure forms negative pressure massage to the human skin, that is, the human skin is slightly raised in a direction of the air pressure generating cavity.

Based on the above, when the separating body 21 between two air pressure generating cavities 201 is deformed, a middle portion of a first wall of the separating body 21 toward one air pressure generating cavity 201 is in a raised state, and a middle portion of a second wall of the separating body 21 toward the other air pressure generating cavity 201 is in a depressed state, so that the volume of one air pressure generating cavity 201 decreases, and the volume of the other air pressure generating cavity 201 increases, or when the separating body 21 between three air pressure generating cavities 201 is deformed, the middle portion of the first wall of the separating body 21 toward at least one air pressure generating cavity 201 is in a raised state, and the middle portion of the second wall of the separating body 21 toward the remaining at least one air pressure generating cavity 201 is in a depressed state, so that the volume of the at least one air pressure generating cavity 201 decreases, and the volume of the remaining at least one air pressure generating cavity 201 increases.

Still further, the housing includes a rigid housing 11 and a flexible housing 12 covering an outer peripheral wall of the rigid housing 11, the at least two massage ports 14 are formed on the flexible housing 12, the accommodating cavity 13 is formed in the rigid housing 11, the rigid housing 11 is provided thereon with a through hole 15 in communication with the accommodating cavity 13, a first positioning body 16 having at least two massage ports 14 on the flexible housing 12 and a second positioning body 17 having at least two openings 202 on the air pressure generating member 2 are both provided through and positioned in the through hole 15, so that each of the openings 202 on the air pressure generating member 2 is respectively connected with and communicated with the corresponding massage port 14; and the flexible housing 12 thereof is made of a silicone material, the rigid housing 11 is made of a plastic material, and the flexible housing 12 provides comfort when holding the massager, and allows the massage ports 14 to be flexibly arranged, thereby achieving comfort during use.

Preferably, the rigid housing 11 includes a first shell 111 and a second shell 112, and the first shell 111 and the second shell 112 are both made of a plastic material; the accommodating cavity 13 is further provided with a mounting sleeve 5 therein, the mounting sleeve 5 is also made of a plastic material, and the air pressure generating member 2 and the motor 3 of the driving device are both positioned in the mounting sleeve 5; the first shell 111 and the second shell 112 are assembled with each other and then fixedly bolted with each other, a positioning sleeve 18 on the first shell 111 is fitted over an upper end of the air pressure generating member 2, and a convex ring 23 on the air pressure generating member 2 is clamped between a lower end face of the positioning sleeve 18 on the first shell 111 and an upper end face of the mounting sleeve 5; and such a structural arrangement facilitates mounting of the air pressure generating member 2, the motor 3, a control board 7 and a battery 6, the control board 7 is provided with a control key 71, and the control key 71 positionally corresponds to a perforation 113 on the rigid shell 11, so that the control key 71 can be pressed when the flexible housing 12 is pressed down.

Embodiment II

As shown in FIGS. 16 to 19, a massager according to the present embodiment has a general structure similar to Embodiment I, but differs from Embodiment I in that: the driving device includes a motor 3, the inner wall of the upper end of the inner cavity 20 is an arc inner wall 203, an upper end and a lower end of the separating body 21 are respectively in a clearance fit or in a contact fit with the inner wall of the upper end and the inner wall of a lower end of the inner cavity 20, the lower end of the separating body 21 is a cylinder 216 in a clearance fit or in a contact fit with the inner wall of the lower end of the inner cavity 20, openings 202 of the two air pressure generating cavities 201 are provided at the upper end of the inner cavity 20, and the rotating shaft of the motor 3 is connected with the cylinder 216, where the separating body 21 is a plate-shaped structure, and the inner cavity 20 may be a circular cavity, a sector-shaped cavity or a rectangular cavity having an arc inner wall 203, the rotating shaft of the motor 3 rotates to drive the separating body 21 to reciprocally oscillate left and right, and the left-right reciprocating oscillation of the separating body 21 is a slight reciprocating oscillation, the separating body 21 does not reach a position of the opening 202 of the air pressure generating cavity 201 during oscillation, the upper end of the separating body 21 is displaced along the arc inner wall 203, and the lower end thereof is the cylinder 216, and therefore when the separating body 21 oscillates, the lower end thereof always abuts against the inner wall of the lower end of the inner cavity 20, so that when the separating body 21 reciprocally oscillates left and right, the volume of one air pressure generating cavity 201 decreases, the volume of the other air pressure generating cavity 201 increases, air in the air pressure generating cavity 201 with the decreased volume rushes to one massage port 14 in corresponding communication therewith, and air at the other massage port 14 rushes to the other air pressure generating cavity 201 with the increased volume, so that a pressure difference is formed between the two massage ports, so that the two massage ports in contact with the human skin perform air stimulation massage on the human skin; as shown in FIG. 20, the massage port with an increased air pressure forms air compression massage to the human skin, that is, the human skin is slightly depressed; and the massage port with a decreased air pressure forms negative pressure massage to the human skin, that is, the human skin is slightly raised in a direction of the air pressure generating cavity.

Based on the above, the separating body 21 is made of a rigid material, one end of the separating body 21 is rotated about an axis of one end of a region between the two air pressure generating cavities 201, so that in the two air pressure generating cavities 201, a first wall of the separating body 21 toward one air pressure generating cavity 201 gradually approaches a first inner wall of the inner cavity to decrease the volume of one air pressure generating cavity 201, and a second wall of the separating body 21 toward the other air pressure generating cavity 201 gradually moves away from a second inner wall of the inner cavity to increase the volume of the other air pressure generating cavity 201.

Among them, the motor 3 has a relatively large power and a torque that can drive the separating body 21 to rotate during use, the rotating shaft of the motor drives the separating body 21 to reciprocally oscillate left and right in both forward and reverse directions, and the forward and reverse rotation of the rotating shaft of the motor is driven by a forward and reverse driving program built in an MCU chip to change a direction of current delivered to the motor 3.

Figure 21:
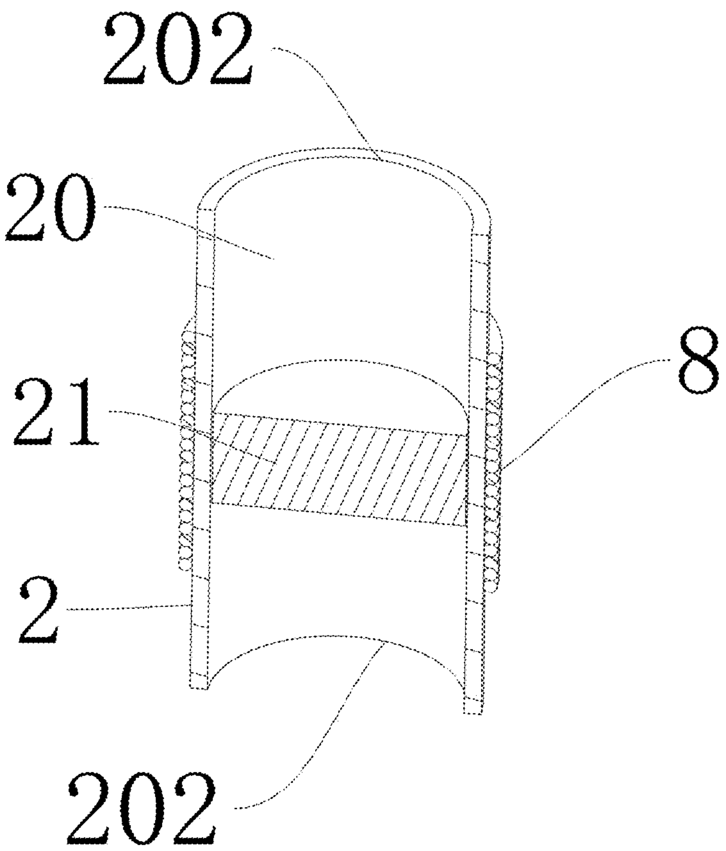
FIG. 21 is a first structural schematic diagram of an air pressure generating member in a straight cylinder type inner cavity.
Figure 22:
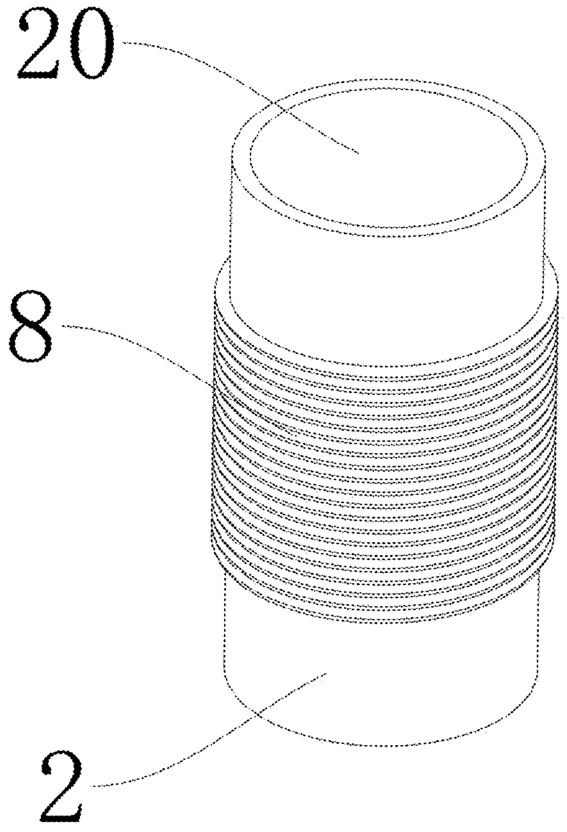
FIG. 22 is a second structural schematic diagram of an air pressure generating member in a straight cylinder type inner cavity.

In another embodiment, as shown in FIGS. 21 and 22, the driving device includes an electromagnetic coil 8, the separating body 21 is a magnetic block, the inner cavity 20 is arranged in a straight cylindrical structure, the magnetic block is located in the inner cavity 20 in the straight cylindrical structure, and an outer peripheral wall of the magnetic block is in a clearance fit or in a contact fit with an inner wall of the inner cavity 20 in the straight cylindrical structure, and the electromagnetic coil is wound on the outer peripheral wall of the inner cavity 20 in the straight cylindrical structure and positionally corresponds to the magnetic block; both end openings 202 of the inner cavity 20 in the straight cylindrical structure are respectively connected with and communicated with each of the massage ports 14 by tube, the electromagnetic coil is energized to continuously switch positive and negative electrodes at a preset interval time, so that the electromagnetic block performs linear reciprocating displacement movement, and the reciprocating displacement movement is a slight displacement movement, so that in two air pressure generating cavities 201, the volume of one air pressure generating cavity 201 decreases and the volume of the other air pressure generating cavity 201 increases, air in the one air pressure generating cavity 201 with the decreased volume rushes to the one massage port 14 in corresponding communication therewith, and air at the other massage port 14 rushes to the other air pressure generating cavity 201 with the increased volume, so that a pressure difference is formed between the two massage ports, so that the two massage ports in contact with the human skin perform air stimulation massage on the human skin; as shown in FIG. 20, the massage port with an increased air pressure forms air compression massage to the human skin, that is, the human skin is slightly depressed, and the massage port with a decreased air pressure forms negative pressure massage to the human skin, that is, the human skin is slightly raised in a direction of the air pressure generating cavity, and the electromagnetic coil generally uses a relatively thick copper wire to increase current flowing therethrough to enhance a magnetic force, which can further drive the slight displacement movement of the magnetic block; and a current direction switching program built in an MCU chip is used to change direction of current delivered to the electromagnetic coil 8, and thus the direction of current is constantly changed and the generated magnetic field also constantly changes, thereby driving the magnetic block to perform the reciprocating displacement movement.

The air pressure generating member in the present embodiment is made of a rigid material.

What is claimed is:

1. A massager, comprising:

a housing provided with an accommodating cavity and at least two massage ports thereon;

an air pressure generating member provided in the accommodating cavity, the air pressure generating member being provided with an inner cavity thereon, the inner cavity being provided with a separating body therein, the separating body separating the inner cavity to form at least two air pressure generating cavities isolated from each other, and each of the air pressure generating cavities being in communication with the corresponding massage port respectively; and a driving device, a driving portion of the driving device being connected with the separating body, and the driving portion of the driving device being configured to drive the separating body to deform to increase or decrease a volume of at least one of the air pressure generating cavities to decrease or increase an internal air pressure, so that an air pressure difference is formed between the the at least two massage ports; wherein the driving device comprises a motor and a rotating member mounted on a rotating shaft of the motor, the rotating member is provided with an eccentric member thereon, the eccentric member is inserted into an insertion slot of the separating body, and the motor drives the rotating member to rotate so that the eccentric member rotates about a central axis of the rotating member to drive the separating body to deform in the inner cavity.

2. The massager according to claim 1, wherein the separating body is made of a flexible material, an outer edge of the separating body is connected with an inner wall of the inner cavity, and when the separating body is deformed, a wall surface located on the separating body within at least one of the air pressure generating cavities being in a depressed state or a raised state to increase or decrease the volume of the air pressure generating cavity.

3. The massager according to claim 1, wherein the separating body is a flexible separating body, an outer edge of the separating body is connected with the inner wall of the inner cavity to form the at least two air pressure generating cavities isolated from each other in the inner cavity, the air pressure generating member is provided thereon with an insertion hole positionally corresponding to the insertion slot on the separating body, and the eccentric member at least partially extends through the insertion hole and is placed in the insertion slot of the separating body.

4. The massager according to claim 3, wherein the separating body comprises a flexible connecting sleeve and at least two flexible sheets provided on an outer side wall of the flexible connecting sleeve, an outer edge of each of the flexible sheets and a lower end of the flexible connecting sleeve are both connected with the inner wall of the inner cavity, upper end portions of the flexible sheets are connected with each other, an upper section and a lower section of the flexible connecting sleeve form an insertion slot and a transition cavity respectively, the insertion hole, the insertion slot and the transition cavity are coaxially arranged, a wall thickness of the upper section of the flexible connecting sleeve is greater than a wall thickness of the lower section, and there is a spacing between an upper end of the flexible connecting sleeve and an inner wall of an upper end of the inner cavity.

5. The massager according to claim 4, wherein the insertion slot, the transition cavity and the insertion hole are all elongated structures, a length of the insertion slot is less than a length of the transition cavity, and a width of the insertion slot is less than a width of the transition cavity.

6. The massager according to claim 5, wherein a length of the insertion hole is not less than the length of the transition cavity, and a width of the insertion hole is not less than the width of the transition cavity.

7. The massager according to claim 4, wherein the insertion slot, the transition cavity and the insertion hole are all circular structures, and an inner diameter of the insertion slot is less than an inner diameter of the transition cavity.

8. The massager according to claim 7, wherein an inner diameter of the insertion hole is not less than the inner diameter of the transition cavity.

9. The massager according to claim 7, wherein both the air pressure generating cavities and the massage ports are three or more in number, an included angle between two adjacent flexible sheets is 5°-120°, and the insertion slot is matched with the eccentric member.

10. The massager according to claim 1, wherein at least two of the massage ports are arranged close to each other, and an upper port edge surface on at least two of the massage ports which is in contact with human skin is a soft contact portion.

11. The massager according to claim 1, wherein the housing comprises a rigid housing and a flexible housing covering an outer peripheral wall of the rigid housing, the accommodating cavity is formed in the rigid housing, the rigid housing is provided thereon with a through hole in communication with the accommodating cavity, and a first positioning body having the at least two massage ports on the flexible housing and a second positioning body having at least two openings on the air pressure generating member are both provided through and positioned in the through hole, so that the openings on the air pressure generating member are respectively connected and communicated with the corresponding massage ports.

12. The massager according to claim 11, wherein the accommodating cavity is further provided with a mounting sleeve therein, the air pressure generating member and the motor of the driving device are both positioned in the mounting sleeve, a positioning sleeve on the rigid housing is fitted over an upper end of the air pressure generating member, and a convex ring on the air pressure generating member is clamped between a lower end face of the positioning sleeve on the rigid housing and an upper end face of the mounting sleeve.

13. The massager according to claim 12, wherein the rigid housing comprises a first shell and a second shell, the first shell and the second shell are assembled with each other and fixedly arranged, a positioning sleeve on the first shell is fitted over the upper end of the air pressure generating member, and the convex ring on the air pressure generating member is clamped between a lower end face of the positioning sleeve on the first shell and the upper end face of the mounting sleeve.

* * * * *